United States Patent
Stastny et al.

(10) Patent No.: US 10,876,558 B2
(45) Date of Patent: Dec. 29, 2020

(54) CONNECTING ARRANGEMENT COMPRISING TWO CONNECTING PARTS

(71) Applicant: Benteler Automobiltechnik GmbH, Paderborn (DE)

(72) Inventors: Peter Stastny, Paderborn (DE); Milan Satorie, Liberec (CZ); Horst Hinzpeter, Paderborn (DE); Aloys Schroeder, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 682 days.

(21) Appl. No.: 15/635,448

(22) Filed: Jun. 28, 2017

(65) Prior Publication Data
US 2018/0023604 A1   Jan. 25, 2018

(30) Foreign Application Priority Data
Jul. 14, 2016   (DE) .................. 10 2016 113 022

(51) Int. Cl.
*F16B 5/06* (2006.01)
*F16B 5/02* (2006.01)

(52) U.S. Cl.
CPC .............. *F16B 5/0664* (2013.01); *F16B 5/02* (2013.01)

(58) Field of Classification Search
CPC ........ F16B 39/22; F16B 39/282; F16B 39/24; F16B 39/30; F16B 5/02; F16B 5/025
See application file for complete search history.

(56) References Cited

U.S. PATENT DOCUMENTS

| | | | | |
|---|---|---|---|---|
| 4,753,540 A | * | 6/1988 | Mottate | F16B 5/025 384/10 |
| 4,842,463 A | * | 6/1989 | Landt | F16B 39/282 411/188 |
| 5,080,545 A | * | 1/1992 | McKinlay | F16B 39/282 411/136 |
| 6,711,803 B1 | * | 3/2004 | Kobayashi | B23P 9/02 228/173.1 |
| 8,899,895 B2 | * | 12/2014 | McKinlay | B66C 23/62 411/147 |
| 8,943,670 B2 | * | 2/2015 | Lohr | F16B 39/24 29/525.02 |
| 10,107,325 B2 | * | 10/2018 | Davis | F16B 39/24 |

(Continued)

FOREIGN PATENT DOCUMENTS

| CN | 101506535 A | 8/2009 |
|---|---|---|
| CN | 203892344 U | 10/2014 |

(Continued)

*Primary Examiner* — Jonathan P. Masinick
(74) *Attorney, Agent, or Firm* — Holland & Hart LLP

(57) ABSTRACT

The disclosure relates to a connecting arrangement comprising a first connecting part and a second connecting part, which are mechanically connectable to one another, wherein the first connecting part has a first clamping surface, wherein the first clamping surface has a first embossed pattern, the second connecting part has a second clamping surface, wherein the second clamping surface has a second embossed pattern, wherein the second embossed pattern is at least partially a negative pattern of the first embossed pattern, and wherein, when bringing together the first clamping surface and the second clamping surface, the first embossed pattern engages positively into the second embossed pattern.

19 Claims, 4 Drawing Sheets

(56) References Cited

U.S. PATENT DOCUMENTS

| | | | |
|---|---|---|---|
| 10,330,136 B2* | 6/2019 | DiChiara, Jr. | F16B 13/0808 |
| 10,393,167 B2* | 8/2019 | Patel | F16B 5/0241 |
| 10,508,679 B2* | 12/2019 | Andersson | F16B 39/24 |
| 2010/0092265 A1* | 4/2010 | Hinzpeter | B21D 53/22 |
| | | | 411/131 |
| 2010/0098511 A1* | 4/2010 | Andersson | F16B 39/282 |
| | | | 411/149 |
| 2012/0144629 A1 | 6/2012 | Wang | |
| 2017/0082136 A1* | 3/2017 | Nagashima | F16B 39/282 |
| 2019/0234447 A1* | 8/2019 | Chang | F16B 39/24 |
| 2019/0301517 A1* | 10/2019 | Kumpf | F16B 33/006 |

FOREIGN PATENT DOCUMENTS

| | | | | |
|---|---|---|---|---|
| CN | 203939849 A | 11/2014 | | |
| CN | 203939849 U | 11/2014 | | |
| DE | 10 2004 062 800 A1 | 7/2005 | | |
| DE | 10 2012 102 906 A1 | 10/2013 | | |
| DE | 202012104410 U1 | 3/2014 | | |
| GB | 300983 A | * | 1/1930 | F16B 2/005 |
| JP | 2003-120643 A | 11/2004 | | |
| JP | 2016003757 A | 1/2016 | | |

* cited by examiner

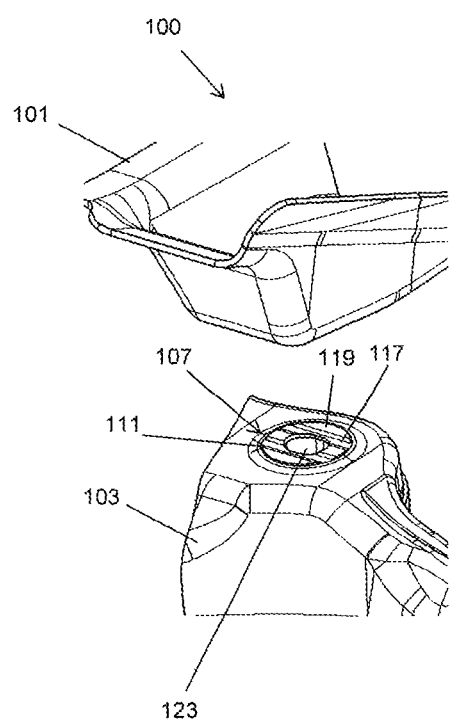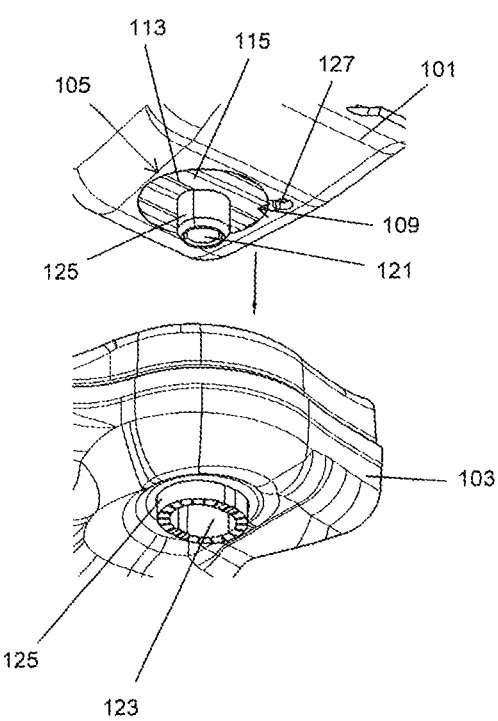
Fig. 1A
Fig. 1B

CONNECTING ARRANGEMENT COMPRISING TWO CONNECTING PARTS

CROSS-REFERENCE TO RELATED APPLICATIONS

This application claims priority to German patent application No. 10 2016 113 022.2, entitled "Verbindungsanordnung mit zwei Verbindungsteilen", and filed on Jul. 14, 2016 by the assignee of this application, the entire disclosure of which is incorporated by reference for all purposes.

BACKGROUND

The present disclosure relates to the mechanical connection of two connecting parts, in particular in a vehicle.

Screw connections are often used for connecting connecting parts to be connected to one another in vehicles. In order to increase the force to be transmitted in the case of screw connections, a stronger screw can, indeed, be used. However, this is associated with increased component costs. Another possibility is to increase a coefficient of friction of the clamping surfaces of the connecting parts to be joined by means of a corrugation. However, the production of a corrugated surface is complicated, because the clamping surfaces have different hardnesses.

The object of the present disclosure is to increase in a manufacturing efficient and in a defined manner a force transmission of a mechanical connection, for example, a screw connection, of connecting parts, such as, for example, clamping plates which are clamped on one another in a production-efficient manner.

This object is achieved by the features of the independent claims. Advantageous examples of the disclosure form the subject matter of the dependent claims, description and accompanying drawings.

SUMMARY

The disclosure is based on the realization that the above object is achieved by mutually adapted embossings in the clamping surfaces of connecting parts, for example, in the clamping surfaces of an axle support and a body of a vehicle.

According to a first aspect, the disclosure relates to a connecting arrangement comprising a first connecting part and a second connecting part, which are mechanically connectable to one another, wherein the first connecting part has a first clamping surface, wherein the first clamping surface has a predetermined first embossed pattern, wherein the second connecting part has a second clamping surface, wherein the second clamping surface has a predetermined second embossed pattern, wherein the predetermined second embossed pattern is at least partially a negative pattern of the first embossed pattern, and wherein, when bringing together the first clamping surface and the second clamping surface, the first embossed pattern engages positively into the second embossed pattern. Due to the negative pattern, the embossed patterns can engage one another and thereby effect a defined positive connection.

The connecting elements can be, for example, press shells.

When these clamping surfaces are joined, they can be aligned with one another by means of adjusting screws or by a nut comprising a leading collar.

In an advantageous example, the first embossed pattern and the second embossed pattern are formed wavelike. Thereby, wave crests form the elevation and wave troughs form the indentations, so that the wave crests of the first embossed pattern engage into the indentations of the second embossed pattern, and vice versa.

In an advantageous example, the first embossed pattern comprises rectilinearly extending embossed ridges, wherein adjacent embossed ridges are separated by an embossed groove, and wherein the second embossed pattern comprises embossed grooves corresponding to the embossed ridges, wherein adjacent embossed grooves of the second embossed pattern are separated by an embossed ridge, which corresponds to the rectilinear embossed grooves of the first embossed pattern. The embossed ridges and/or the embossed grooves can be extending rectilinearly.

In an advantageous example, the exemplary rectilinearly extending embossed ridges and the exemplary rectilinearly extending embossed grooves of the first embossed pattern are aligned parallel to one another within the tolerance range, for example +/−5° or +/−2°, wherein the exemplary rectilinearly extending embossed ridges and the exemplary rectilinearly extending embossed grooves of the second embossed pattern are aligned parallel to one another within the tolerance range, for example +/−5° or +/−2°.

In an advantageous example, the exemplary rectilinearly extending embossed ridges and the exemplary rectilinearly extending embossed grooves of the first embossed pattern extend diagonally or parallel across the first clamping surface, wherein the exemplary rectilinearly extending embossed ridges and the exemplary rectilinearly extending embossed grooves of the second embossed pattern extend diagonally or parallel across the second clamping surface.

In an advantageous example, the first clamping surface encompasses a first connecting aperture, wherein the exemplary rectilinearly extending embossed ridges and the exemplary rectilinearly extending embossed grooves of the first embossed pattern extend radially from the first connecting aperture wherein the second clamping surface encompasses a second connecting aperture, and wherein the exemplary rectilinearly extending embossed ridges and the exemplary rectilinearly extending embossed grooves of the second embossed pattern extend radially from the second connecting aperture.

In an advantageous example the widths of the embossed ridges and/or embossed grooves increase or remain constant with increasing distance from the respective connecting aperture. The embossed ridge and/or groove can expand fanlike or scalloped.

In an advantageous example, the respective embossed ridges and/or the respective embossed grooves each comprise a square or a rounded cross-section.

In an advantageous example, the first embossed pattern and the second embossed pattern are formed identically at least in sections and are offset with respect to one another by at least one ridge width.

In an advantageous example, the first embossed pattern and the second embossed pattern are mechanically embossed into the respective connecting part, in particular in the respective clamping surface.

In an advantageous example, the first clamping surface encompasses a first connecting aperture, wherein the second clamping surface encompasses a second connecting aperture, wherein the first connecting aperture and the second connecting aperture are aligned flush with one another and are penetrated by a connecting element, in particular by a screw.

In an advantageous example, the first clamping surface encompasses a first connecting aperture, wherein the second clamping surface encompasses a second connecting aperture, wherein the second connecting aperture is encompassed by a threaded nut comprising a leading collar, and wherein the leading collar is insertable into the first connecting aperture.

In an advantageous example, the first clamping surface encompasses a first connecting aperture, wherein the second clamping surface encompasses a second connecting aperture, wherein the first connecting aperture is encompassed by a threaded nut comprising a leading collar, and wherein the leading collar is insertable into the second connecting aperture.

In an advantageous example, the first clamping surface and the second clamping surface have a circular or elliptic shape.

In an advantageous example, the first connecting part is an axle support or a vehicle body part of a vehicle, and the second connecting part is a vehicle body part or an axle support of a vehicle.

In an advantageous example, a connecting sleeve, which extends at least partially through the respective connecting aperture and which is provided for receiving of a connecting element, for example a screw or a dowel pin, is disposed in the first connecting aperture and/or the second connecting aperture.

In an advantageous example, a fitting hole for the receiving of a dowel pin is provided outside of the respective clamping surface. Thereby, the embossed pattern can advantageously be aligned with respect to one another.

According to a second aspect, the disclosure relates to a method for manufacturing of a connecting arrangement comprising a first connecting part and a second connecting part, wherein the first connecting part has a first clamping surface, wherein the second connecting part has a second clamping surface, comprising: embossing a predetermined first embossed pattern into the first clamping surface, embossing a predetermined second embossed pattern into the second clamping surface, wherein the predetermined second clamping pattern is at least partially a negative pattern of the first embossed pattern, and bringing together the first clamping surface and the second clamping surface to engage the first embossed pattern and the second embossed pattern in a positive engagement.

In an advantageous example, the method comprises the force fit connecting of the brought together clamping surfaces, for example by means of a screw.

In an advantageous example, the method comprises the embossing of the respective embossed pattern into the respective clamping surface with a mechanical embossing tool. The embossing of the respective embossed pattern may each be achieved in an embossing step.

Further steps of the manufacturing method result directly from the features of the connecting arrangement.

BRIEF DESCRIPTION OF THE DRAWINGS

Examples of the principles of this disclosure are explained in more detail with reference to the appended drawings.

FIGS. 1A and 1B show a perspective view of a connecting arrangement according to an example;

DETAILED DESCRIPTION OF THE DRAWINGS

Figure 2:
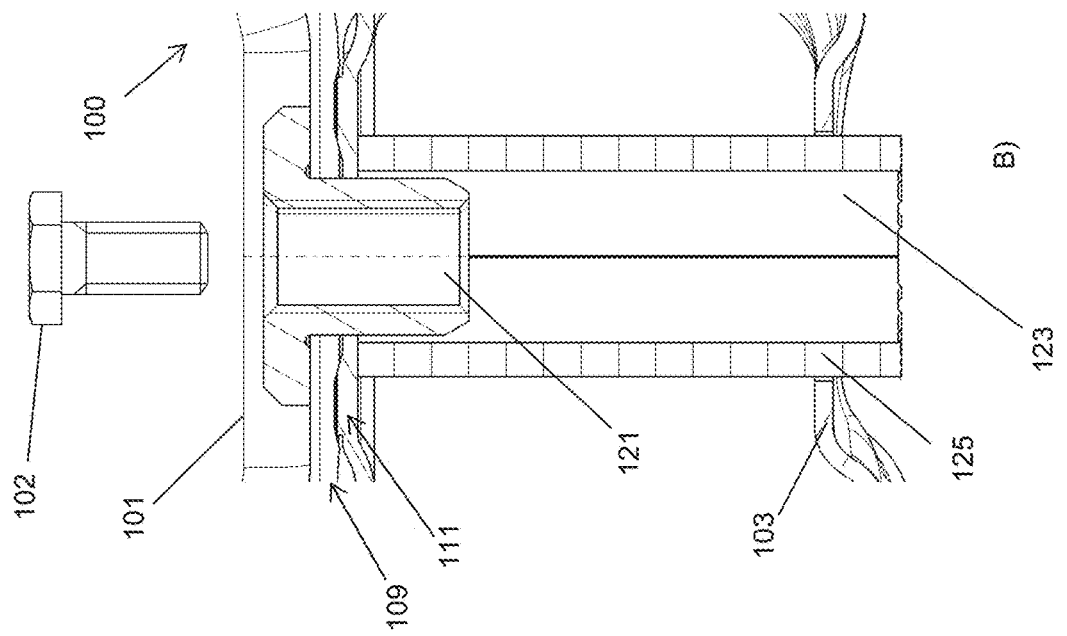
FIGS. 2A and 2B show a side view of the connecting arrangement according to an example.
Figure 2:
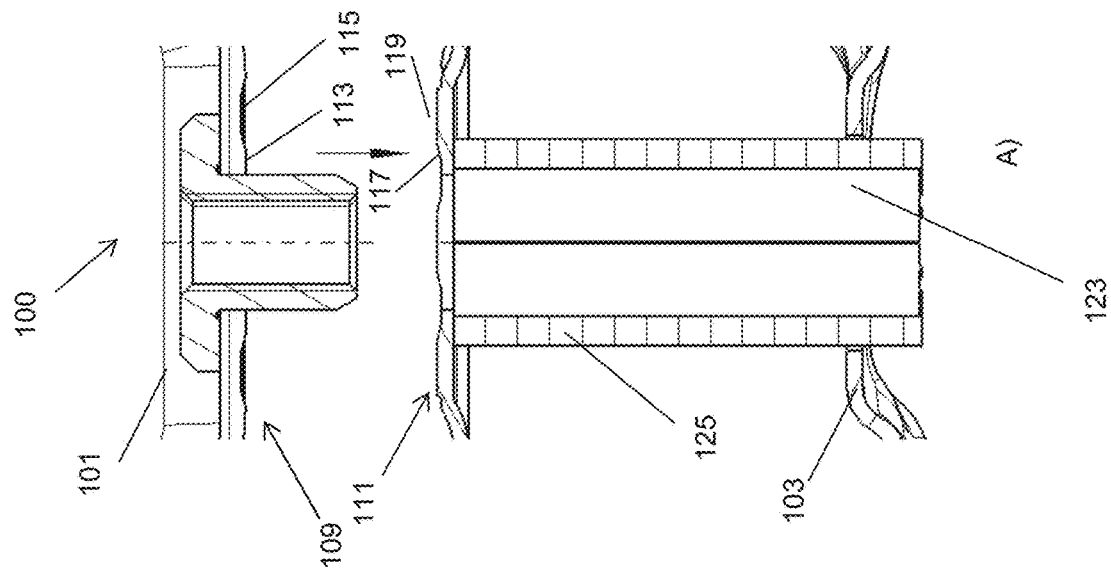

FIGS. 1A and 1B depict schematic representations of a connecting arrangement 100 comprising a first connecting part 101 and a second connecting part 103, which are mechanically connectable to one another, for example by means of a screw connection. The first connecting part 101 and the second connecting part 103 may be an axle support and a vehicle body part or a vehicle body part and an axle support of a vehicle, for example of a motor vehicle.

The first connecting part 101 has a first clamping surface 105, wherein the first clamping surface 105 has a predetermined first embossed pattern 109. The second connecting part 103 has a second clamping surface 107, wherein the second clamping surface 107 has a predetermined second embossed pattern 111.

The predetermined second embossed pattern 111 is in depth and/or width at least partially a negative pattern of the first embossed pattern 109, such that when bringing together the first clamping surface 105 and the second clamping surface 107 in the direction depicted in FIG. 1 by an arrow the first embossed pattern 109 engages positively and defined into the second embossed pattern 111. The embossed pattern 109 and 111 are matched to each other, such that a defined and reproducible positive connection may be realized.

According to an example the first embossed pattern 109 comprises embossed ridges 113, for example extending rectilinearly, wherein adjacent embossed ridges 113 are separated by an embossed groove 115, for example extending rectilinearly, and wherein the second embossed pattern 111 comprises embossed grooves 117, for example rectilinearly extending, corresponding to the embossed ridges 113 as a negative pattern, wherein adjacent embossed grooves 117 of the second embossed pattern 111 are each separated by an embossed ridge 119, for example rectilinearly extending, which corresponds to the embossed grooves 115 of the first embossed pattern 109 as a negative pattern.

In all examples the embossed grooves 115, 117 may be wider than the embossed ridges 113, 119. The embossed grooves 115, 117 may further be deeper or less deep than the embossed ridges 113, 119.

According to an example the clamping surfaces 105, 107 may be formed on an elevated, for example stamped out, plateaux of the connecting elements 101, 103.

In FIG. 2A the connecting arrangement 100 is shown in a not brought together and in FIG. 2B in a brought together state. The embossed pattern 109 and 11 are at least partially formed inverse to one another, such that the embossed ridges 113, 119 engage fittingly into the embossed grooves 115, 117. Sleeves in the first connecting aperture 121 and/or the second connecting aperture 123 may be configured to receive a connecting element 102, such as a screw or dowel pin.

Figure 3A:
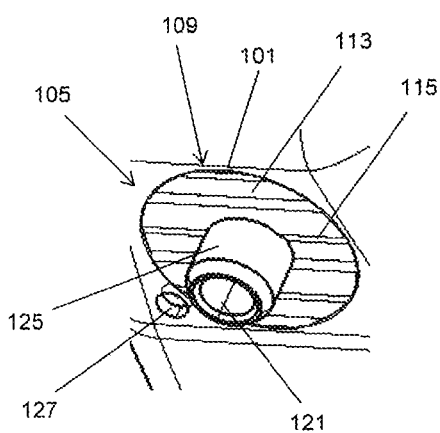
FIGS. 3A and 3B show various views of the clamping surfaces.
Figure 3B:
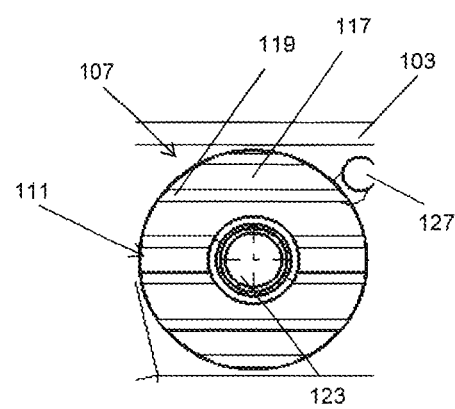
Figure 4A:
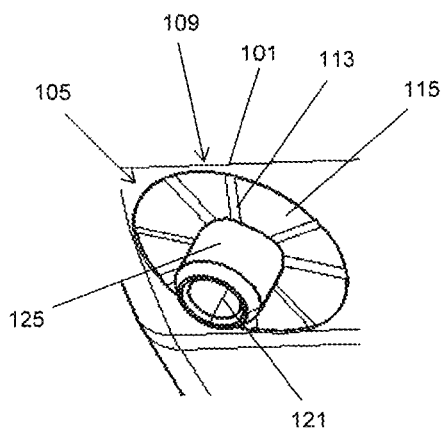
FIGS. 4A and 4B show various views of the clamping surfaces.
Figure 4B:
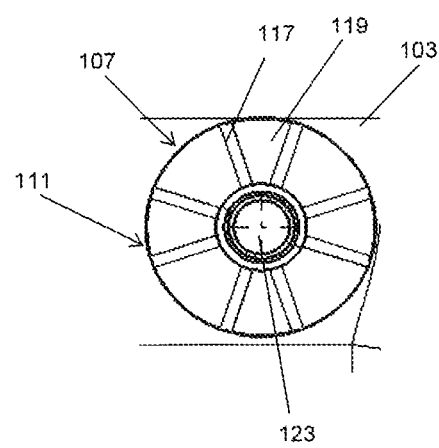

In FIGS. 3A and 3B views of the clamping surfaces 105, 107 are shown. According to an example the embossed ridges 113, 119 as well as the embossed grooves 115, 117 are generally rectilinearly and/or linearly extending. In this manner, a clamping action against twisting or transverse displacement of the clamping surfaces 105, 107 is achieved.

In FIGS. 3A and 3B views of the clamping surfaces 105, 107 are shown. According to an example the embossed ridges 113, 119 as well as the embossed grooves 115, 117 are radially outwards extending and/or extending star-shaped starting from the respective connecting aperture 121, 123. In this manner, a clamping action against twisting and displacement of the clamping surfaces 105, 107 is achieved.

According to an example the embossed ridges 113, 119 as well as the embossed grooves 115, 117 can radially expand fanlike or flowerlike, whereby a stable clamping action can be achieved with increasing radius of the clamping surfaces 105, 107.

According to an example at least four embossed ridges 113, 119 and at least four embossed grooves 115, 117 are formed per embossed pattern 109, 111.

The clamping surfaces 105, 107 may be circular or elliptic. The connecting apertures 121, 123 may likewise be circularly or elliptically formed.

The connecting arrangement 100 may be used for example advantageously in body part connections between axle supports and the body shell, meaning the connecting elements 101, 103, of a motor vehicle. There, a nut 125 is provided on the body side, which either takes on the leading during the so called marriage or may be modified to this function with low cost. Additionally, the embossing tools can be modified with low to no cost for the clamping surfaces 105, 107 to be screwed, such that embossings matched to one another, which form an embossed pattern 109, 111 are mounted to the clamping surfaces 107, 109 to be screwed.

LIST OF REFERENCE NUMBERS

100 Connecting arrangement
101 First connecting part
102 Connecting element
103 Second connecting part
105 First clamping surface
107 Second clamping surface
109 First embossed pattern
111 Second embossed pattern
113 Embossed ridge
115 Embossed groove
117 Embossed groove
119 Embossed ridge
121 Connecting aperture
123 Connecting aperture
125 Threaded nut

What is claimed is:

1. A connecting arrangement comprising
a first connecting part and a second connecting part that are configured to mechanically connect to one another, wherein:
the first connecting part comprises a first clamping surface, wherein the first clamping surface comprises a first embossed pattern;
the second connecting part comprises a second clamping surface, wherein the second clamping surface comprises a second embossed pattern;
the second embossed pattern is at least partially a negative pattern of the first embossed pattern, and wherein, when bringing together the first clamping surface and the second clamping surface, the first embossed pattern engages positively into the second embossed pattern; and
the first clamping surface encompasses a first connecting aperture, wherein the second clamping surface encompasses a second connecting aperture, wherein the first connecting aperture is encompassed by a threaded nut comprising a leading collar, and wherein the leading collar is configured to insert into the second connecting aperture; and
a connecting sleeve disposed in the first connecting aperture, or the second connecting aperture, or both, wherein the connecting sleeve extends at least partially through the respective first connecting aperture or second connecting aperture and is configured to receive a connecting element.

2. The connecting arrangement according to claim 1, wherein the first embossed pattern comprises embossed ridges, wherein adjacent embossed ridges are separated by an embossed groove; and wherein the second embossed pattern comprises embossed grooves corresponding to the embossed ridges, wherein adjacent embossed grooves of the second embossed pattern are separated by an embossed ridge corresponding to the embossed grooves of the first embossed pattern.

3. The connecting arrangement according to claim 2, wherein the embossed ridges and the embossed grooves of the first embossed pattern are aligned parallel to one another within a tolerance range, and wherein the embossed ridges and the embossed grooves of the second embossed pattern are aligned parallel to one another within the tolerance range.

4. The connecting arrangement according to claim 2, wherein the embossed ridges and the embossed grooves of the first embossed pattern extend diagonally or parallel across the first clamping surface, and wherein the embossed ridges and the embossed grooves of the second embossed pattern extend diagonally or parallel across the second clamping surface.

5. The connecting arrangement according to claim 2, wherein the first clamping surface encompasses a first connecting aperture, and wherein the embossed ridges and the embossed grooves of the first embossed pattern extend radially from the first connecting aperture, and wherein the second clamping surface encompasses a second connecting aperture, and wherein the embossed ridges and the embossed groves of the second embossed pattern extend radially from the second connecting aperture.

6. The connecting arrangement according to claim 5, wherein the widths of the radially extending embossed ridges increase or remain constant with increasing distance from the respective connecting aperture.

7. The connecting arrangement according to claim 2, wherein one or more of the embossed ridges, and the embossed grooves each comprise a square or a rounded cross-section.

8. The connecting arrangement according to claim 2, wherein the first embossed pattern and the second embossed pattern are formed identically at least in sections and are offset with respect to one another by at least one ridge width.

9. The connecting arrangement according to claim 1, wherein the first embossed pattern and the second embossed pattern are mechanically embossed into the respective connecting part.

10. The connecting arrangement according to claim 1, wherein the first clamping surface encompasses the first connecting aperture, wherein the second clamping surface encompasses the connecting aperture, wherein the first connecting aperture and the second connecting aperture are aligned flush with one another and are penetrated by the connecting element.

11. The connecting arrangement according to claim 10, wherein the connecting element is a screw.

12. The connecting arrangement according to claim 1, wherein the first clamping surface and the second clamping surface have a circular or elliptic shape.

13. The connecting arrangement according to claim 1, wherein the first connecting part is an axle support or a vehicle body part of a vehicle, and the second connecting part is a vehicle body part or an axle support of a vehicle.

14. A method for manufacturing a connecting arrangement, comprising:
 providing a first connecting part and a second connecting part, wherein the first connecting part comprises a first clamping surface and the second connecting part comprises a second clamping surface, wherein the first clamping structure encompasses a first connecting aperture, wherein the second clamping surface encompasses a second connecting aperture, wherein the first connecting aperture is encompassed by a threaded nut comprising a leading collar, and wherein the leading collar is configured to insert into the second connecting aperture;
 embossing of a first embossed pattern into the first clamping surface;
 embossing a second embossed pattern into the second clamping surface, wherein the second clamping pattern is at least partially a negative pattern of the first embossed pattern; and
 bringing together the first clamping surface and the second clamping surface, to engage the first embossed pattern and the second embossed pattern in a positive engagement; and
 placing a connecting sleeve in the first connecting aperture, or the second connecting aperture, or both, such that the connecting sleeve extends at least partially through the respective first connecting aperture or the second connecting aperture and is configured to receive a connecting element.

15. The method for manufacturing according to claim 14, wherein the first embossed pattern comprises embossed ridges, wherein adjacent embossed ridges are separated by an embossed groove, and wherein the second embossed pattern comprises embossed grooves corresponding to the embossed ridges, wherein adjacent embossed grooves of the second embossed pattern are separated by an embossed ridge corresponding to the embossed grooves of the first embossed pattern.

16. The method for manufacturing according to claim 14, further comprising:
 aligning the embossed ridges and the embossed grooves of the first embossed pattern in parallel to one another within a tolerance range; and
 aligning the embossed ridges and the embossed grooves of the second embossed pattern in parallel to one another within the tolerance range.

17. The method for manufacturing according to claim 14, wherein the embossed ridges and the embossed grooves of the first embossed pattern extend diagonally or parallel across the first clamping surface, and wherein the embossed ridges and the embossed grooves of the second embossed pattern extend diagonally or parallel across the second clamping surface.

18. The method for manufacturing according to claim 14; further comprising:
 forming the first embossed pattern and the second embossed pattern identically at least in sections; and
 offsetting the sections with respect to one another by at least one ridge width.

19. The method for manufacturing according to claim 14; further comprising:
 embossing the first embossed pattern and the second embossed pattern mechanically into the respective connecting part.

\* \* \* \* \*